(12) United States Patent
Jung et al.

(10) Patent No.: US 7,872,717 B2
(45) Date of Patent: Jan. 18, 2011

(54) LIQUID CRYSTAL DISPLAY DEVICE HAVING MULTIPLE ALIGNMENT AREAS AND METHOD OF MANUFACTURING THE SAME

(75) Inventors: Tae-Hyeog Jung, Suwon-si (KR); Kee-Doo Kim, Suwon-si (KR); Hae-Jin Heo, Suwon-si (KR)

(73) Assignee: Samsung Mobile Display Co., Ltd., Yongin (KR)

( * ) Notice: Subject to any disclaimer, the term of this patent is extended or adjusted under 35 U.S.C. 154(b) by 494 days.

(21) Appl. No.: 11/245,720

(22) Filed: Oct. 6, 2005

(65) Prior Publication Data

US 2006/0077328 A1   Apr. 13, 2006

(30) Foreign Application Priority Data

Oct. 13, 2004   (KR) .................. 10-2004-0081628

(51) Int. Cl.
*G02F 1/1337* (2006.01)
(52) U.S. Cl. .................. 349/128; 349/123; 349/129; 349/130
(58) Field of Classification Search .............. 349/128, 349/123, 129, 130
See application file for complete search history.

(56) References Cited

U.S. PATENT DOCUMENTS

| | | | |
|---|---|---|---|
| 5,576,863 A | | 11/1996 | Aoki et al. |
| 5,617,229 A | * | 4/1997 | Yamamoto et al. ............ 349/42 |
| 5,850,274 A | | 12/1998 | Shin et al. |
| 6,323,926 B2 | | 11/2001 | Watanabe et al. |
| 6,535,260 B1 | * | 3/2003 | Tasaka et al. ............... 349/124 |
| 2003/0147033 A1 | * | 8/2003 | Stalder et al. ............... 349/129 |
| 2003/0156237 A1 | * | 8/2003 | Lin et al. .................... 349/110 |

FOREIGN PATENT DOCUMENTS

CN   1293379   5/2001

(Continued)

OTHER PUBLICATIONS

European Search Report for EP 05109389.6-2205 dated Jan. 24, 2006.

(Continued)

*Primary Examiner*—David Nelms
*Assistant Examiner*—Lauren Nguyen
(74) *Attorney, Agent, or Firm*—Christie, Parker & Hale, LLP

(57) ABSTRACT

A liquid crystal display device having vertical alignment films formed on pixel electrodes of a thin film transistor substrate and a common electrode of a common electrode substrate, and horizontal alignment films formed in a shape of plural belts on the vertical alignment films. The horizontal alignment film of the thin film transistor substrate and the horizontal alignment film of the common electrode substrate are substantially perpendicular to each other. Accordingly, a liquid crystal layer interposed between the two substrates includes a splay area, a homeotropic area, and hybrid area, wherein the hybrid area is disposed around the splay area and the homeotropic area. Since the hybrid area serves as an alignment transition seed, the liquid crystal molecules of the splay area can be easily changed to have a band alignment. Therefore, it is possible to decrease an alignment transition voltage and to enhance an alignment transition speed.

24 Claims, 11 Drawing Sheets

| | FOREIGN PATENT DOCUMENTS | | |
|---|---|---|---|
| CN | 1386210 | | 12/2002 |
| EP | 0 965 876 A2 | | 12/1999 |
| EP | 0 996 028 A3 | | 3/2000 |
| EP | 0 996 028 A2 | | 4/2000 |
| EP | 0 965 876 A3 | | 3/2001 |
| GB | 2-023866 | * | 1/1980 |
| JP | 9-96790 | | 4/1997 |
| JP | 11-7018 | | 1/1999 |
| JP | 2001-290153 | | 10/2001 |
| KR | 0147018 | | 5/1998 |

OTHER PUBLICATIONS

Patent Abstracts of Japan for Publication number: 2001-290153; Date of publication of application Oct. 19, 2001, in the name of Nobukazu Nagae et al.

Korean Patent Abstracts for Publication number: 100147018; Date of publication of application May 14, 1998, in the name of Hyun Dae Kim et al.

Patent Abstracts of Japan; Publication No. 09-096790; Publication Date: Aug. 4, 1997; in the name of Tanaka, et al.

Patent Abstracts of Japan; Publication No. 11-007018; Publication Date: Dec. 1, 1999; in the name of Ishihara, et al.

* cited by examiner

Upper plate

Lower plate

Rubbing direction

Upper plate

Rubbing direction

Lower plate

- Vertical alignment
- Splay alignment
- Hybrid alignment(vertical+horizontal)

LIQUID CRYSTAL DISPLAY DEVICE HAVING MULTIPLE ALIGNMENT AREAS AND METHOD OF MANUFACTURING THE SAME

CROSS-REFERENCE TO RELATED APPLICATIONS

This application claims priority to and the benefit of Korean Patent Application No. 10-2004-0081628 filed on Oct. 13, 2004 in the Korean Intellectual Property Office, the entire content of which is incorporated herein by reference.

BACKGROUND OF THE INVENTION (a) Field of the Invention

The present invention relates to a liquid crystal display device, and more particularly, to an optically compensated bend (hereinafter, referred to as OCB) mode liquid crystal display device.

(b) Description of Related Art

In liquid crystal display devices, a liquid crystal material is interposed between an upper substrate on which a common electrode, etc. are formed and a lower substrate on which thin film transistors, pixel electrodes, etc. are formed. In a liquid crystal display device, an electric field is formed by applying different potentials to the pixel electrodes and the common electrode, thereby varying alignment of liquid crystal molecules so that images are displayed by adjusting transmittance of light.

Among such liquid crystal display devices, since an OCB mode liquid crystal display device has merits of a wide viewing angle and rapid response, application thereof has been actively studied.

In the OCB mode liquid crystal display device, as shown in FIG. 15, an alignment of liquid crystal molecules is changed to a band alignment by applying a high voltage to the initially splay-aligned liquid crystal molecules and then the transmittance of light is adjusted by varying the size of voltage and adjusting the bending degree of the band.

In the OCB mode liquid crystal display device, a very high voltage and a long time are typically required for changing the initially splay-aligned liquid crystal molecules to have the band alignment.

In order to solve the above problem, a twist OCB mode liquid crystal display device has been suggested in Japanese Patent Application Laid-open No. H9-096790. In the twist OCB mode, by initially aligning the liquid crystal molecules to be twisted by 180°, the alignment of liquid crystal molecules can be changed continuously without generating a discontinuous surface due to change of phase when changed to the band alignment. However, since a chiral dopant is added in the twist OCB mode, the liquid crystal molecules operate outside a two-dimensional plane. Accordingly, an optical overshoot phenomenon occurs, thereby causing a deterioration of image quality.

On the other hand, Japanese Patent Application Laid-open No. H11-007018 discloses that an alignment material having a large pre-tilt angle is disposed only in a part of a pixel and the part is used as a transition seed. However, in such a liquid crystal display device, there is a problem that much labor is required for arrangement of the upper and lower substrates in order to accurately position the transition seed areas, and there is also a problem that electro-optical characteristics become uneven inside a pixel since areas having different alignment exist in the pixel.

SUMMARY OF THE INVENTION

In exemplary embodiments of the present invention. the above problems are solved by reducing a transition time and decreasing a transition voltage by facilitating transition from splay alignment to band alignment without deteriorating optical characteristics of liquid crystal in an OCB mode liquid crystal display device.

In order to accomplish this, according to the present invention, alignment films are formed such that a liquid crystal layer includes a splay area, a homeotropic area, and a hybrid area.

Specifically, in an exemplary embodiment according to the present invention, there is provided a liquid crystal display device including a first substrate having an inner surface and an outer surface, a first electrode formed on the inner surface of the first substrate, a first alignment film of a first orientation formed on the first electrode, a second alignment film of a second orientation formed in a shape of plural belts substantially in parallel with each other on the first alignment film, a second substrate having an inner surface and an outer surface with the inner surface being opposite to the inner surface of the first substrate, a second electrode formed on the inner surface of the second substrate, a third alignment film of the first orientation formed on the second electrode, a fourth alignment film of the second orientation formed in a shape of plural belts substantially in parallel with each other on the third alignment film, and a liquid crystal layer interposed between the first substrate and the second substrate. The plural belts of the second alignment film and the plural belts of the fourth alignment film cross over each other.

Here, the liquid crystal display device may further include a plurality of gate lines formed on the inner surface of the first substrate, a plurality of data lines crossing the plurality of gate lines, and a plurality of thin film transistors connected to the plurality of gate lines and the plurality of data lines. In addition, the first electrode may include a plurality of pixel electrodes connected to the plurality of thin film transistors, respectively, and the second electrode may include a single common electrode opposite to the plurality of pixel electrodes.

Each of the plural belts of the second alignment film may be formed between corresponding two adjacent gate lines to extend substantially in parallel to the gate lines and each of the plural belts of the fourth alignment film may be formed between corresponding two adjacent data lines to extend substantially in parallel to the data lines.

The alignment films of the first orientation may be vertical alignment films and the alignment films of the second orientation may be horizontal alignment films. The horizontal alignment films may have a pre-tilt angle of 4° to 5°, and the vertical alignment films may have a pre-tilt angle of 89° to 90°. Liquid crystal molecules of the liquid crystal layer may be aligned to be vertical to the first and second substrates in an area where the first alignment film and the third alignment film overlap with each other without the second alignment film and the fourth alignment film disposed therebetween, may be splay-aligned in an area where the second alignment film and the fourth alignment film overlap with each other, and may be aligned in a hybrid state in an area where the first alignment film and the fourth alignment film overlap with each other without the second alignment film disposed therebetween and an area where the second alignment film and the third alignment film overlap with each other without the fourth alignment film disposed therebetween. In addition, the area where the liquid crystal molecules are splay-aligned may be positioned above the pixel electrodes, the area where the liquid crystal molecules are aligned to be vertical may be positioned above portions where the gate lines and the data lines cross over each other, and the area where the liquid crystal molecules are aligned to be hybrid may be positioned above the gate lines and the data lines.

The liquid crystal display device may further include a black matrix formed on the inner surface of the second substrate and overlapped with the area where the liquid crystal molecules are aligned to be vertical and the area where the liquid crystal molecules are aligned to be hybrid. The plural belts of the second alignment film and the plural belts of the fourth alignment film may cross over each other to be substantially perpendicular to each other.

The liquid crystal display device may further include a compensation film disposed on at least one of the outer surfaces of the first and second substrates.

In another exemplary embodiment according to the present invention, there is provided a liquid crystal display device including a first substrate having an inner surface and an outer surface, a first electrode formed on the inner surface of the first substrate, a second substrate having an inner surface and an outer surface, the inner surface being opposite to the inner surface of the first substrate, a second electrode formed on the inner surface of the second substrate, and a liquid crystal layer interposed between the first substrate and the second substrate. The liquid crystal layer includes a splay area where liquid crystal molecules are splay-aligned, a homeotropic area where the liquid crystal molecules are aligned to be vertical to the first and second substrates, and a hybrid area where the liquid crystal molecules are changed from vertical alignment to horizontal alignment or are changed from horizontal alignment to vertical alignment when the liquid crystal layer is traversed from the first substrate to the second substrate.

The hybrid area may be disposed around the splay area, and the hybrid area may be also disposed around the homeotropic area.

The liquid crystal display device may further include a first vertical alignment film formed on the first electrode, a first horizontal alignment film formed in a shape of plural belts substantially in parallel with each other on the first vertical alignment film, a second vertical alignment film formed on the second electrode, and a second horizontal alignment film formed in a shape of plural belts substantially in parallel with each other on the second vertical alignment film. The plural belts of the first horizontal alignment film and the plural belts of the second horizontal alignment film may cross over each other to be substantially perpendicular to each other.

The liquid crystal display device may further include a plurality of gate lines formed on the inner surface of the first substrate, a plurality of data lines crossing the plurality of gate lines, and a plurality of thin film transistors connected to the plurality of gate lines and the plurality of data lines.

Here, the first electrode may include a plurality of pixel electrodes connected to the plurality of thin film transistors, respectively, and the second electrode may include a single common electrode opposite to the plurality of pixel electrodes.

Each of the plural belts of the first horizontal alignment film may be formed between corresponding two adjacent gate lines to extend substantially in parallel to the gate lines, and each of the plural belts of the second horizontal alignment film may be formed between corresponding two adjacent data lines to extend substantially in parallel to the data lines.

The horizontal alignment films may have a pre-tilt angle of 4° to 5°, and the vertical alignment films may have a pre-tilt angle of 89° to 90°.

The homeotropic area of the liquid crystal layer may include an area where the first vertical alignment film and the second vertical alignment film overlap with each other without the first horizontal alignment film and the second horizontal alignment film disposed therebetween, the splay area may include an area where the first horizontal alignment film and the second horizontal alignment film overlap with each other, and the hybrid area may include an area where the first vertical alignment film and the second horizontal alignment film overlap with each other without the first horizontal alignment film disposed therebetween and an area where the first horizontal alignment film and the second vertical alignment film overlap with each other without the second horizontal alignment film disposed therebetween. In addition, the splay area may be positioned above the pixel electrodes, the homeotropic area may be positioned above portions where the gate lines and the data lines cross over each other, and the hybrid area may be positioned above the gate lines and the data lines. The liquid crystal display device may further include a black matrix formed on the inner surface of the second substrate, and overlapped with the homeotropic area and the hybrid area.

The liquid crystal display device may be manufactured using a method including forming a first alignment film of a first orientation on a first substrate having a first electrode, forming a first photo-resist pattern on the first alignment film, forming a second alignment film of a second orientation on the first photo-resist film, and forming a second alignment film pattern by removing portions of the second alignment film placed on the first photo-resist pattern concurrently as removing the first photo-resist pattern.

The method may further include forming a third alignment film of the first orientation on a second substrate having a second electrode, forming a second photo-resist pattern on the third alignment film, forming a fourth alignment film of the second orientation on the second photo-resist pattern, and forming a fourth alignment film pattern by removing portions of the fourth alignment film placed on the second photo-resist pattern concurrently as removing the second photo-resist pattern. Here, the second alignment film pattern and the fourth alignment film pattern may each have a shape of plural belts that are substantially in parallel with each other.

The method may further include arranging the second alignment film pattern and the fourth alignment film pattern to be substantially perpendicular to each other and coupling the first substrate and the second substrate with a gap therebetween.

In yet another exemplary embodiment according to the present invention, a liquid crystal display device is provided. The liquid crystal display device includes first and second substrates having a liquid crystal layer disposed therebetween, first horizontal and vertical alignment films formed on the first substrate on a side facing the liquid crystal layer, and second horizontal and vertical alignment films formed on the second substrate on a side facing the liquid crystal layer. The liquid crystal layer includes a plurality of liquid crystal molecules. The first horizontal alignment film is exposed to some of the liquid crystal molecules adjacent to the first substrate while the first vertical alignment film is exposed to others of the liquid crystal molecules adjacent to the first substrate. The second horizontal alignment film is exposed to some of the liquid crystal molecules adjacent to the second substrate while the first vertical alignment film is exposed to others of the liquid crystal molecules adjacent to the second substrate.

BRIEF DESCRIPTION OF THE DRAWINGS

The accompanying drawings, together with the specification, illustrate exemplary embodiments of the present invention, and, together with the description, serve to explain the principles of the present invention.

FIGS. 4 to 13A and 13B are perspective views and cross-sectional views sequentially illustrating a process of forming alignment films of the liquid crystal display device according to an exemplary embodiment of the present invention;

DETAILED DESCRIPTION

Figure 1:
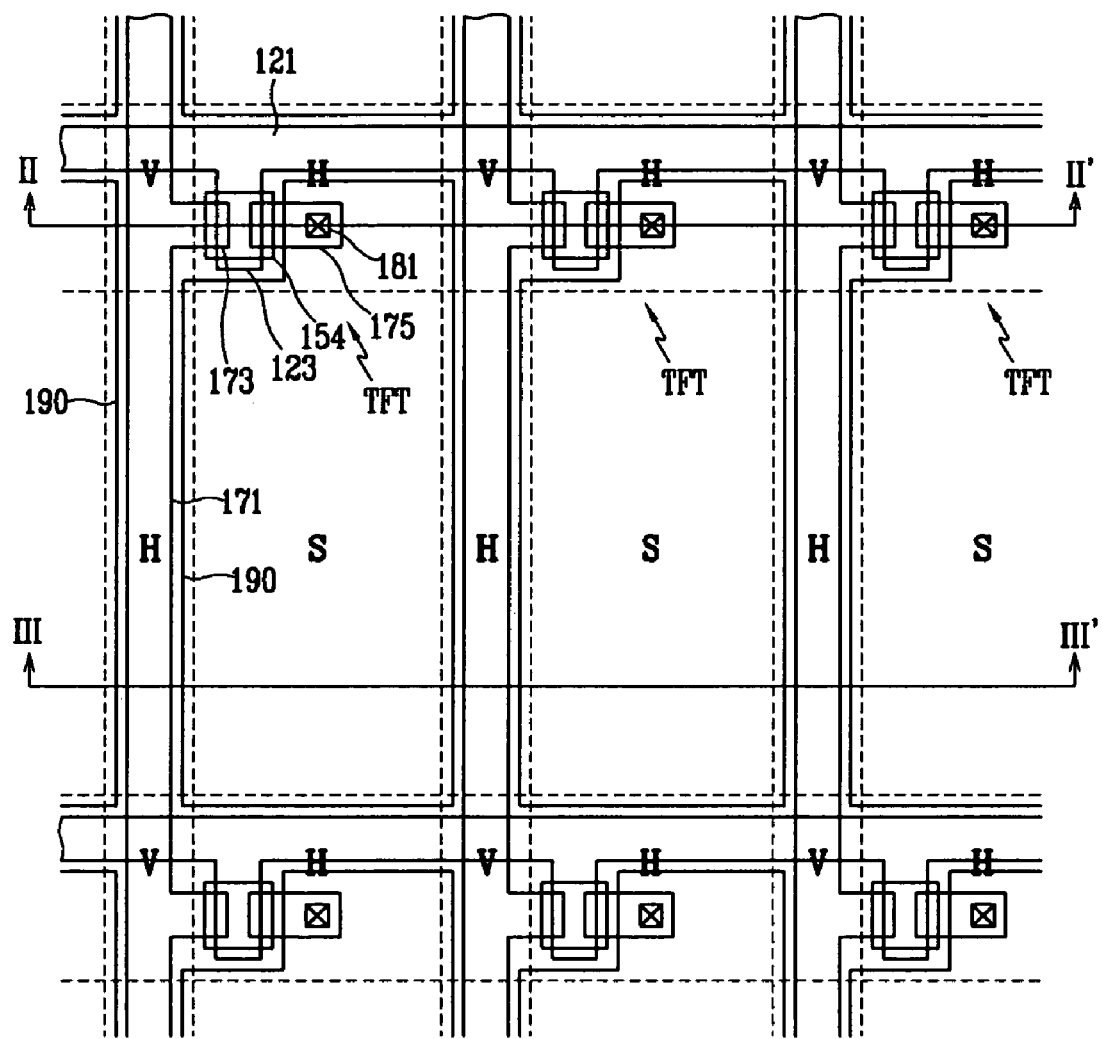
FIG. 1 is a plan view of a liquid crystal display device according to an exemplary embodiment of the present invention.

In the following detailed description, only certain exemplary embodiments of the present invention are shown and described, simply by way of illustration. As those skilled in the art would realize, the described embodiments may be modified in various different ways, all without departing from the spirit or scope of the present invention. Accordingly, the drawings and description are to be regarded as illustrative in nature, and not restrictive. There may be parts shown in the drawings, or parts not shown in the drawings, that are not discussed in the specification as they are not essential to a complete understanding of the invention. Like reference numerals designate like elements.

In the drawings, thicknesses are enlarged to clearly express various layers and areas. When it is described that one element such as a layer, a film, an area, a plate, etc. is formed on another element, it means that one element exists right on another element or that one element exists on another element with a further element therebetween. On the other hand, when it is described that one element is formed right on another element, it generally means that no other element exists therebetween.

Now, a liquid crystal display device according to an exemplary embodiment of the present invention will be described in detail with reference to the attached drawings.

Figure 2:
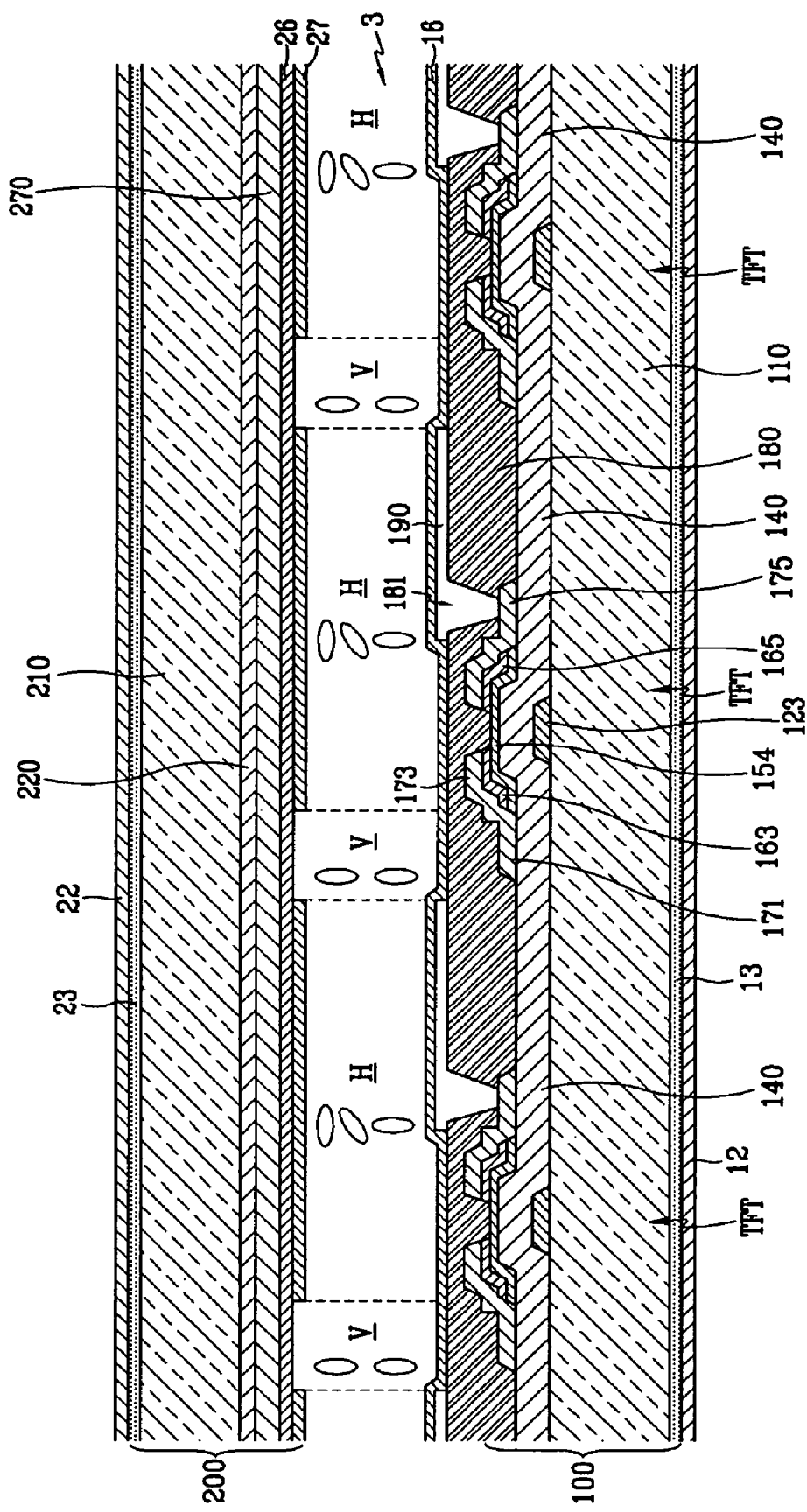
FIG. 2 is a cross-sectional view taken along Line II-II' of FIG. 1.
Figure 3:
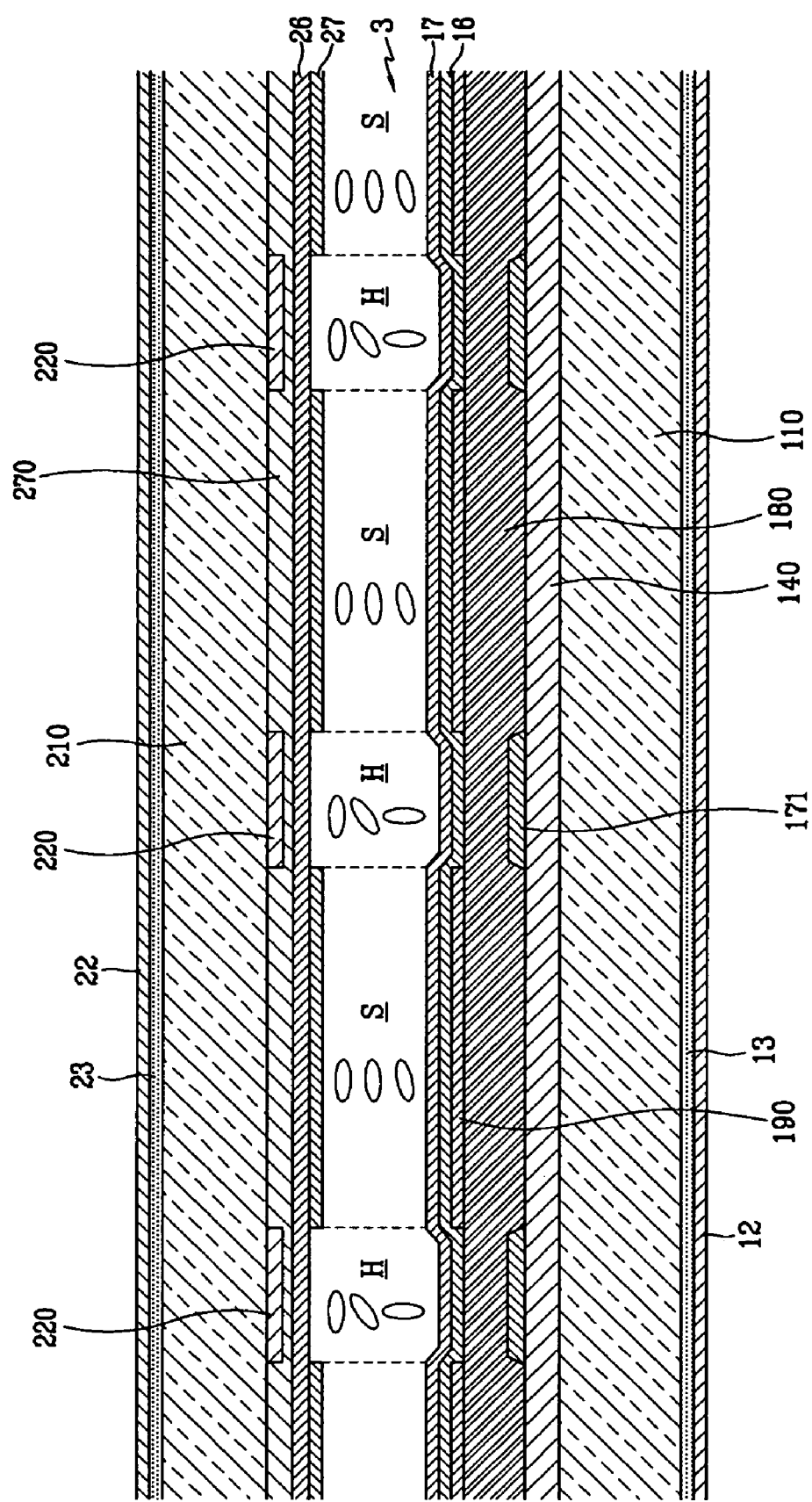
FIG. 3 is a cross-sectional view taken along Line III-III' of FIG. 1.

FIG. 1 is a plan view of a liquid crystal display device according to an exemplary embodiment of the present invention, FIG. 2 is a cross-sectional view taken along Line II-II' of FIG. 1, and FIG. 3 is a cross-sectional view taken along Line III-III' of FIG. 1.

The liquid crystal display device according to an exemplary embodiment of the present invention is an active type, and includes a thin film transistor substrate 100, a common electrode substrate 200, a liquid crystal layer 3 interposed between the two substrates 100 and 200, compensation films 13 and 23 attached to the outsides of the two substrates 100 and 200, respectively, and polarizing films 12 and 22 attached to the outsides of the compensation films 13 and 23, respectively. In addition, the liquid crystal display device may further include a backlight unit.

The present invention can be applied to a field-sequential (FS) liquid crystal display device which displays colors time-divisionally. In this case, in the backlight unit, three color light sources, such as light-emitting diodes emitting light components of red, green, and blue, are provided.

Of course, in a liquid crystal display device employing a color-filter scheme which displays colors space-divisionally, color filters of red, green, and blue are formed on the thin film transistor substrate 100 or the common electrode substrate 200 and the backlight unit emits white light.

In addition, the present invention can be applied to a passive liquid crystal display panel, as well as an active liquid crystal display panel.

Hereinafter, the thin film transistor substrate 100 will be described.

Gate interconnections 121 and 123 which have a thickness of 1,000 Å to 3,500 Å and are made of a conductive material such as aluminum or an aluminum alloy, chromium or a chromium alloy, molybdenum or a molybdenum alloy, chromium nitride or molybdenum nitride, etc. are formed on an insulating substrate 110.

Each gate interconnection 121 and 123 includes a gate line 121 extending laterally and gate electrodes 123 which protrude from the gate line 121.

By way of example, the gate interconnections 121 and 123 can have a structure of two or more layers. In this case, at least one layer of the two or more layers should be made of a metal material having a low-resistance characteristic.

The insulating substrate 110 is covered with a gate insulting film 140, which has a thickness of 3,500 Å to 4,500 Å and is made of an insulating material such as silicon nitride or silicon oxide.

A semiconductor pattern 154, which has a thickness of 800 Å to 1,500 Å and is made of amorphous silicon, etc., is formed on the gate insulating film 140 to be overlapped with the gate electrode 123. Ohmic contact layers 163 and 165, which have a thickness of 500 Å to 800 Å and are made of amorphous silicon, etc. doped with conductive impurities, are formed on the semiconductor pattern 154.

Data interconnections 171, 173, and 175, which have a thickness of 1,500 Å to 3,500 Å and are made of a conductive material such as aluminum or an aluminum alloy, chromium or a chromium alloy, molybdenum or a molybdenum alloy, chromium nitride or molybdenum nitride, etc., are formed on the ohmic contact layers 163 and 165 and the gate insulating film 140.

Each data interconnection 171, 173, and 175 extends longitudinally and includes a data line 171 which intersects or crosses over with the gate line 121 to define a pixel area, a source electrode 173 which protrudes from the data line 171 and extends onto one ohmic contact layer 163, and a drain electrode 175 which is opposite to the source electrode 173 and extends from above the other ohmic contact layer 165 to above the gate insulating film 140 inside the pixel area.

Here, the data interconnections 171, 173, and 175 can have a structure of two or more layers. In this case, at least one layer of the two or more layers may be made of a metal material having a low-resistance characteristic.

The data interconnections 171, 173, and 175 and the semiconductor pattern 154 are covered with a protective film 180, which has a thickness of 1,500 to 2,500 Å and is made of an insulating material such as silicon nitride or silicon oxide.

Contact holes 181 for exposing the drain electrodes 175 are formed in the protective film 180. Pixel electrodes 190 connected to the drain electrodes 175 through the contact holes 181 are formed on the protective film 180. Here, the pixel electrodes 190 are made of a transparent conductive material such as indium tin oxide (ITO) or indium zinc oxide (IZO).

A vertical alignment film 16 is formed on the pixel electrodes 190 over the entire display area, and a horizontal alignment film 17 is formed in a shape of plural belts on the vertical alignment film 16. The belt-shaped horizontal alignment film 17 extends substantially in parallel to the gate line 121 and overlaps with the pixel electrode 190 between two adjacent gate lines 121.

In other embodiments, the horizontal alignment film 17 may be formed right on the pixel electrodes 190 and then the vertical alignment film 16 may be formed in a belt shape (i.e., a shape of plural, substantially parallel belts) on the horizontal alignment film 17.

The common electrode substrate 200 opposite to the thin film transistor substrate 100 will now be described.

A black matrix 220, which covers the gate lines 121, the data lines 171, and a part of the thin film transistor (TFT) on the thin film transistor substrate, is formed on a second insulating substrate 210.

A common electrode 270, which is made of ITO or IZO and covers the whole display area of the second insulating substrate 210, is formed on the second insulating substrate 210 and the black matrix 220.

A vertical alignment film 26 is formed on the whole surface of the common electrode 270, and a horizontal alignment film 27 is formed in a shape of plural belts on the vertical alignment film 26. Here, the horizontal alignment film 27, which has a shape of plural belts, extends in a direction substantially parallel to the data lines 171, that is, in a direction substantially perpendicular to the gate lines 121, when the common electrode substrate 200 is coupled to the thin film transistor substrate 100 (i.e., the substrates 100 and 200 are assembled together and be substantially parallel to each other), and overlaps the pixel electrode 190 between two adjacent data lines 171.

On the other hand, the black matrix 220 is disposed to be overlapped with the vertical alignment films 16 and 26 which are exposed between the horizontal alignment films 17 and 27 when the common electrode substrate 200 is coupled to the thin film transistor substrate 100.

Here, it is desirable that the horizontal alignment films 17 and 27 have a pre-tilt angle of 4° to 5° and the vertical alignment film 16 and 26 have a pre-tilt angle of 89° to 90°.

In other embodiments, the horizontal alignment film 27 may be formed right on the common electrode 270 and the vertical alignment film 26 may be formed in a belt shape (i.e., a shape of plural, substantially parallel belts) on the horizontal alignment film 27.

The common electrode substrate 200 and the thin film transistor substrate 100 are coupled (or assembled) together with a predetermined gap therebetween, and the liquid crystal layer 3 is filled (i.e., injected or disposed) between the two substrates. The liquid crystal layer 3 has a cell gap of 5 to 10 μm, for example. The alignment state of liquid crystal molecules are different depending on positions thereof due to the vertical alignment films 16 and 26 and the horizontal alignment films 17 and 27 respectively formed on the two substrates 100 and 200.

First, in the areas of the pixel electrodes 190 where the horizontal alignment films 17 and 27 are respectively disposed at the upper side and the lower side, the liquid crystal molecules are splay-aligned. These areas can be referred to as splay areas S. In other words, the horizontal alignment films 17 and 27 are exposed to the liquid crystal layer 3 in the splay areas S.

Next, in the areas where the vertical alignment films 16 and 26 are respectively disposed at the upper side and the lower side and the data lines 171 and the gate lines 121 intersect with or cross over each other, the liquid crystal molecules are aligned to be vertical to the substrates 110 and 210. These areas can be referred to as homeotropic areas V. In the homeotropic areas V, the horizontal alignment film 17 and the horizontal alignment film 27 are not disposed between the vertical alignment films 16 and 26. In other words, the vertical alignment films 16 and 26 are exposed to the liquid crystal layer 3 in the homeotropic areas V.

In the areas above the gate lines 121 and the data lines 171 where the vertical alignment films 16 and 26 are disposed at one of the upper side and the lower side and the horizontal alignment films 17 and 27 are disposed at the other of the upper side and the lower side, the liquid crystal molecules are changed from the vertical alignment to the horizontal alignment or are changed from the horizontal alignment to the vertical alignment while the liquid crystal layer is traversed from the lower side to the upper side. These areas can be referred to as hybrid areas H. In other words, in the hybrid areas H, the vertical alignment film 16 or 26 is exposed to the liquid crystal layer 3 on one side, and the horizontal alignment film 17 or 27 is exposed to the liquid crystal layer 3 on the other side. According to the present exemplary embodiment, in the hybrid areas H which overlap with the gate lines 121, the liquid crystal molecules are vertically aligned at the side of the thin film transistor substrate 100 and are horizontally aligned at the side of the common electrode substrate 200. Further, in the hybrid areas H which overlap with the data lines 171, the liquid crystal molecules are horizontally aligned at the side of the thin film transistor substrate 100 and are vertically aligned at the side of the common electrode substrate 200.

Here, the homeotropic areas V and the hybrid areas H are covered with the black matrix 220.

The dotted lines of FIGS. 1 to 3 denote boundaries between the three alignment areas S, V, and H.

Polarization axes of the two polarizing films 12 and 22 are disposed to be substantially perpendicular to each other and to form 45° or 135° about the rubbing direction of the alignment films.

It is desirable that the compensation films 13 and 23 are adjusted such that a compensation characteristic is substantially optimized with reference to a green light component.

As described above, by dividing the liquid crystal layer into the splay areas S, the homeotropic areas V, and the hybrid areas H, and allowing the hybrid areas H to surround the splay areas S, the hybrid areas H can serve as alignment transition seeds when an alignment transition voltage is applied to the liquid crystal layer, so that the liquid crystal molecules of the splay areas S are easily changed to the band alignment. Therefore, it is possible to reduce the alignment transition voltage and to enhance the alignment transition speed.

In addition, since the homeotropic areas V or the hybrid areas H serving as the alignment transition seeds are covered with the black matrix 220, only the splay areas S contribute to display, and since the liquid crystal molecules of the splay areas S exhibit a substantially uniform electro-optical characteristic, enhanced image quality is realized.

Since the hybrid areas H serving as the alignment transition seeds are formed even when the thin film transistor substrate 100 and the common electrode substrate 200 are slightly inaccurately arranged with respect to each other, the arrangement margin between the substrates 100 and 200 is increased.

A method of manufacturing the liquid crystal display device having the aforementioned structure will be described with reference to FIGS. 1 to 3, FIGS. 4 to 13A, and FIG. 13B.

First, a method of manufacturing the thin film transistor substrate 100 will be described with reference to FIGS. 1 to 3.

A metal layer is deposited on the insulating substrate 110 and is etched using photolithography, thereby forming the gate interconnections 121 and 123, and silicon nitride, etc. is deposited thereon, thereby forming a gate insulating film 140 covering the gate interconnections 121 and 123.

A hydrogenated amorphous silicon layer and an amorphous silicon layer highly doped with n-type impurities are continuously deposited on the gate insulating film 140 and are etched using photolithography, thereby forming an incomplete contact layer and semiconductor patterns 151 and 154.

Subsequently, a gate metal layer is deposited thereon and is etched using photolithography, thereby forming the data interconnections 171, 173, and 175 including the source and drain electrodes 173 and 175. Next, the contact layers 163 and 165 are completely formed by etching the contact layer exposed between the source electrodes 173 and the drain electrodes 175.

An inorganic insulating material such as silicon nitride, etc., or an organic insulating material such as resin, etc., is deposited on the data interconnections 171, 173, and 175 and is etched using photolithography, thereby forming a protecting film 180 having contact holes 181 for exposing the drain electrodes 175.

Subsequently, a transparent conductive material such as ITO or IZO is deposited on the protective film 180 and is etched using photolithography, thereby forming the pixel electrodes 190 connected to the drain electrodes 175 through the contact holes 181.

Last, the vertical alignment film 16 is formed on the pixel electrodes 190 and the horizontal alignment film 17 is formed using a lift-off method. The processes of forming the vertical alignment film 16 and the horizontal alignment film 17 will be described in detail later.

Next, a method of manufacturing the common electrode substrate 200 will be described.

A chromium film or a two-layer film of chromium and chromium oxide is formed on the insulating substrate 210 and is etched using photolithography, thereby forming the black matrix 220.

A transparent conductive material such as ITO or IZO is deposited on the black matrix 220, thereby forming the common electrode 270.

Last, the vertical alignment film 26 is formed on the common electrode 270 and the horizontal alignment film 27 is formed using a lift-off method. The processes of forming the vertical alignment film 26 and the horizontal alignment film 27 will be described in detail later.

Next, the processes of forming the vertical alignment films 16 and 26 and the horizontal alignment films 17 and 27 on the thin film transistor substrate 100 and the common electrode substrate 200 will be described in detail with reference to FIGS. 4 to 13B.

FIGS. 4 to 13B are perspective views or cross-sectional views sequentially illustrating the processes of forming the alignment films of the liquid crystal display device according to an exemplary embodiment of the present invention. The processes of forming the alignment films 26 and 27 on the common electrode 270 are illustrated in FIGS. 4 to 13B as an example.

Figure 4:
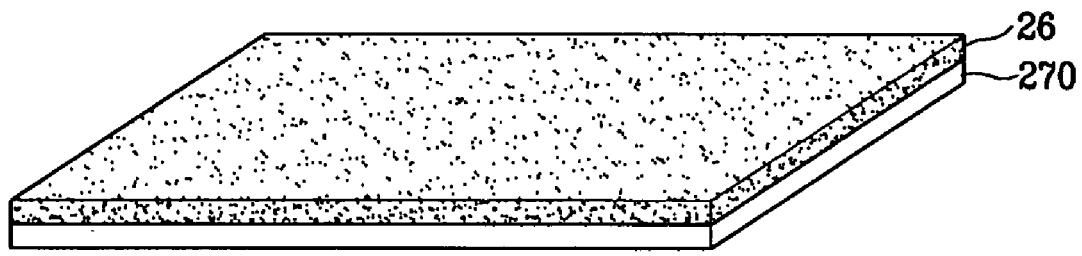

First, as shown in FIG. 4, polyimide (PI) is deposited on the common electrode 270 and is baked at a temperature of 80° C. for two minutes and at a temperature of 180° C. for fifteen minutes, thereby forming the vertical alignment film 26. In the present exemplary embodiment, the vertical alignment film 26 is formed using AL00010 (product name of JSR Corporation, Japan). In other embodiments, any other suitable PI material may be used to form the vertical alignment film 26.

Figure 5:
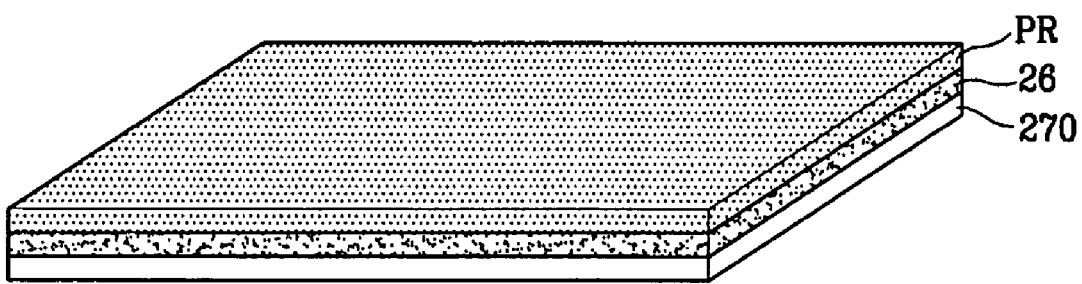

Next, as shown in FIG. 5, a photo-resist PR is deposited on the vertical alignment film 26 and is pre-baked at a temperature of 90° C. for 3 minutes. At this time, DNR-H100PL (product name of Dong Jin Semichem LTD, Korea) can be used as the photo-resist PR. In other embodiments, any other suitable photo-resist material may be used as the photo-resist PR.

Figure 6A:
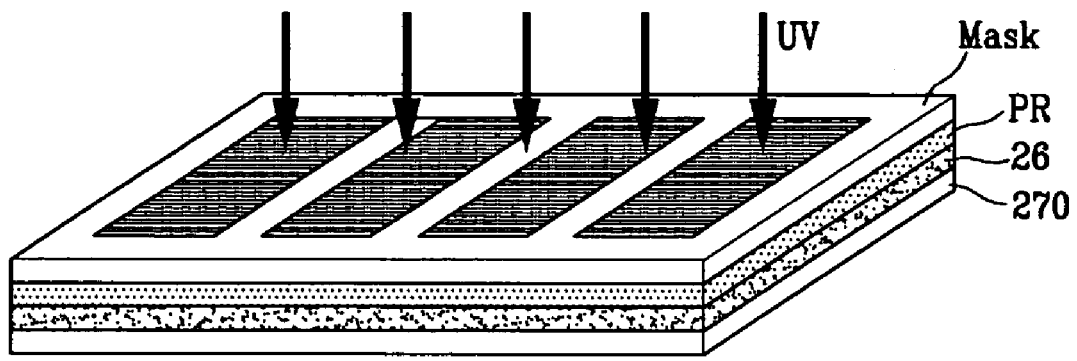
Figure 6B:
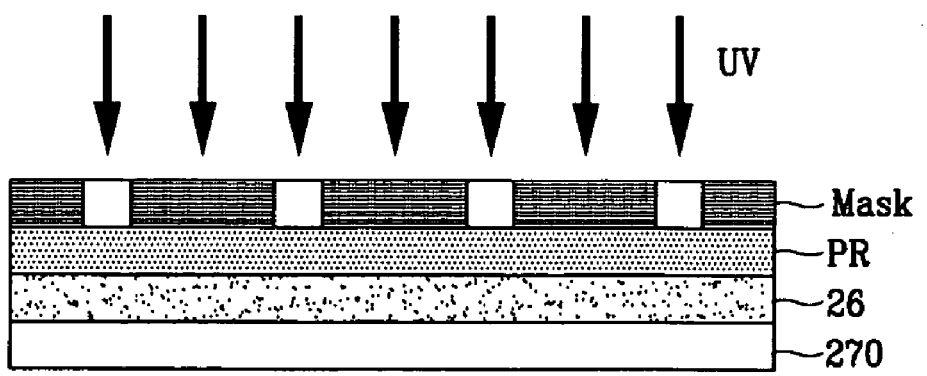

Subsequently, as shown in FIGS. 6A and 6B, an exposure mask is disposed on the photo-resist PR, an ultraviolet ray (UV) is applied thereto to expose desired portions of the photo-resist PR, and a post-baking process is carried out thereto.

Figure 7A:
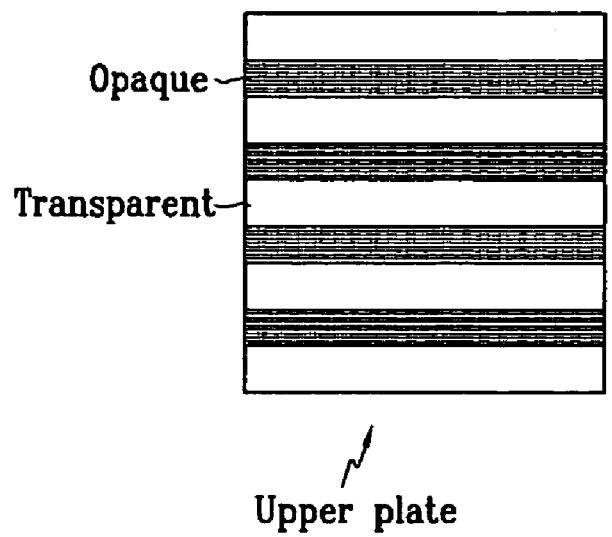

At this time, as shown in FIG. 7A, transparent portions and opaque portions of the exposure mask are arranged in a shape of belts extending laterally or horizontally.

Figure 7B:
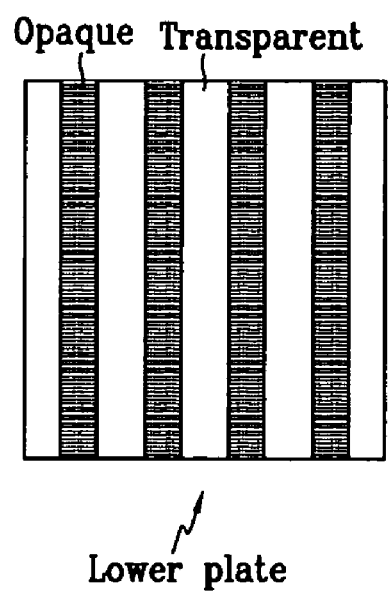

On the other hand, the vertical alignment film 16 is formed on the thin film transistor substrate 100 using the same method, i.e., a photo-resist PR is deposited thereon, and then an exposing process is carried out. At this time, as shown in FIG. 7B, transparent portions and opaque portions of the exposure mask used here are arranged in a shape of belts extending longitudinally or vertically. That is, the exposure mask used for the common electrode substrate 200 and the exposure mask used for the thin film transistor substrate 100 are disposed such that the transparent portions having a belt shape on the thin film transistor substrate 100 and the common electrode substrate 200, respectively, are substantially perpendicular to each other.

Figure 8:
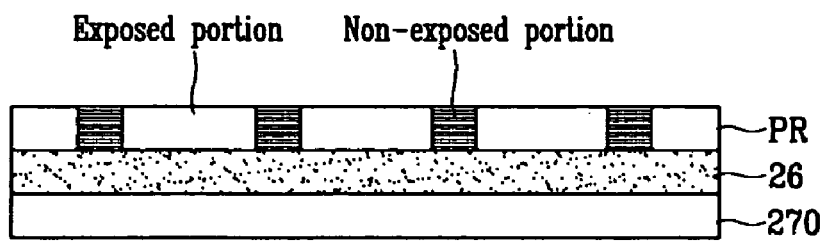

Next, as shown in FIG. 8, by removing the exposure mask, exposed portions and non-exposed portions are generated in the photo-resist PR.

Figure 9:
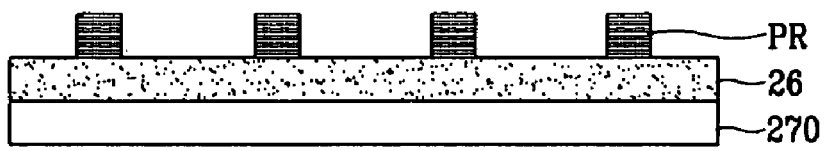

By developing the photo-resist PR, as shown in FIG. 9, the exposed portions are removed and only the non-exposed portions remain in a belt shape. Here, when a positive photo-resist is used, the exposed portions are removed, but when a negative photo-resist is used, the exposed portions remain and the non-exposed portions are removed.

Figure 10:
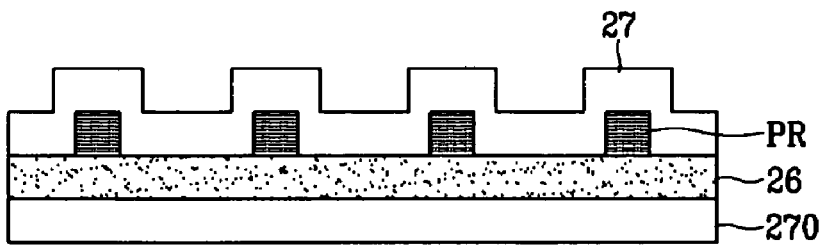

The photo-resist PR remaining in a belt shape is hard baked at a temperature of 180° C. for 5 minutes. Then, as shown in FIG. 10, polyimide is deposited on the photo-resist PR remaining in a belt shape and is baked at a temperature of 80° C. for 2 minutes and at a temperature of 180° C. for 5 minutes, thereby forming the horizontal alignment film 27. At this time, the horizontal alignment film 27 can be made of AL3046 (product name by JSR Corporation, Japan). In other embodiments, any other suitable material may be used to form the horizontal alignment film 27.

Figure 11A:
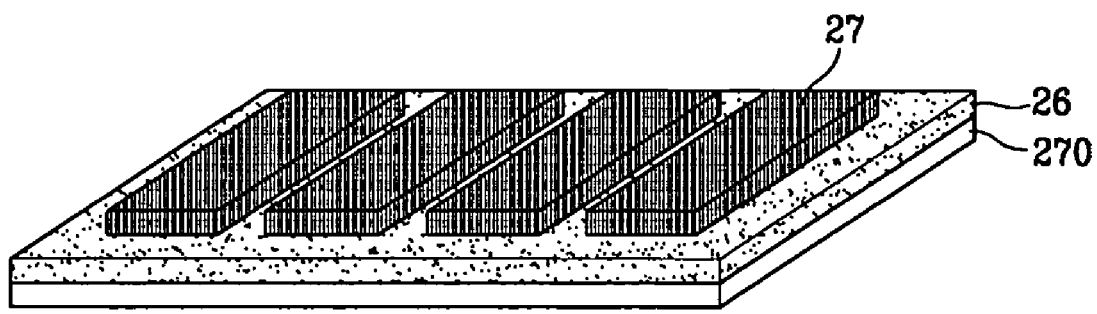
Figure 11B:

Subsequently, by removing the photo-resist PR remaining in a belt shape, as shown in FIGS. 11A and 11B, the horizontal alignment film 27 is formed in a shape of belts. Here, the belt-shaped horizontal alignment film 27 is formed by removing the horizontal alignment film 27 placed on the remaining photo resist PR when removing the photo-resist PR. This method is referred to as a lift-off method.

Figure 12A:
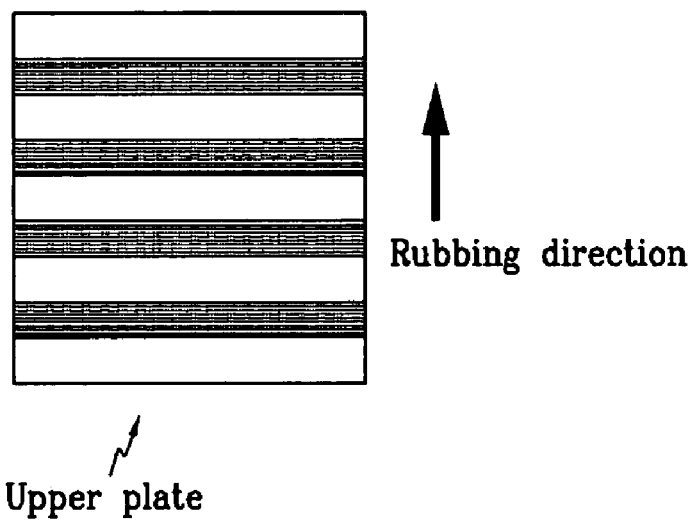
Figure 12B:
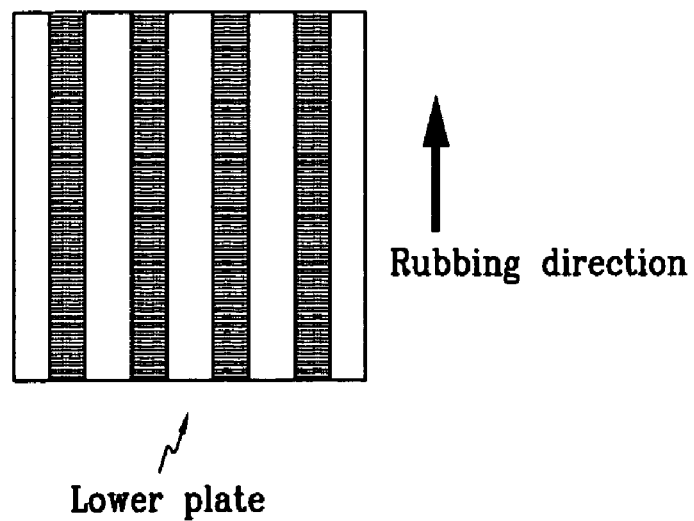

Next, as shown in FIGS. 12A and 12B, the alignment films 26 and 27 of the common electrode substrate 200 and the alignment films 16 and 17 of the thin film transistor substrate 100 are rubbed in the same direction.

Figure 13A:
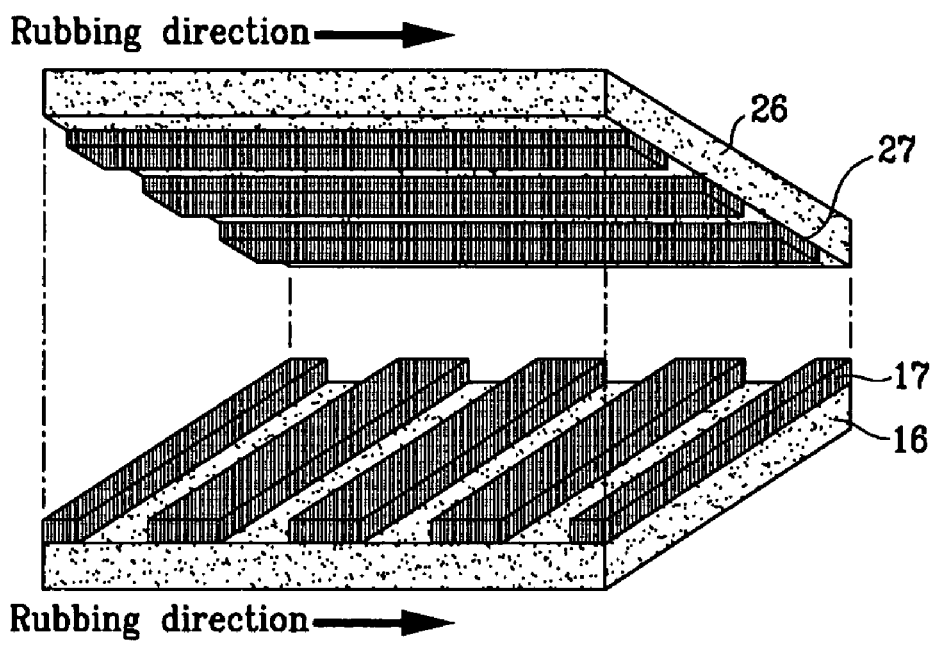
Figure 13B:
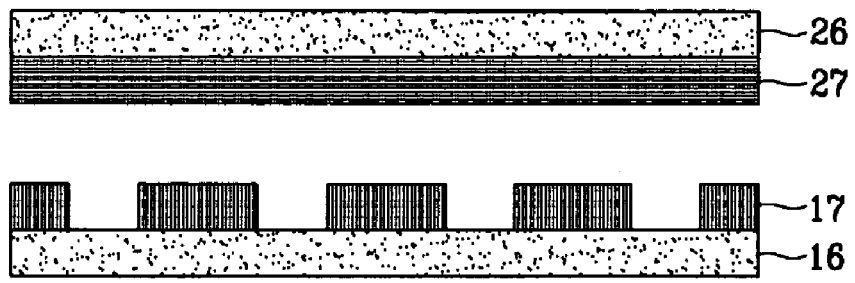

Next, as shown in FIGS. 13A and 13B, the common electrode substrate 200 and the thin film transistor substrate 100 are coupled. In other words, the substrates 200 and 100 are placed or assembled substantially parallel to each other with a gap therebetween. At this time, the rubbing directions of the two substrates 200 and 100 are the same and the belt-shaped horizontal alignment films 17 and 27 are substantially perpendicular to each other.

Figure 14:
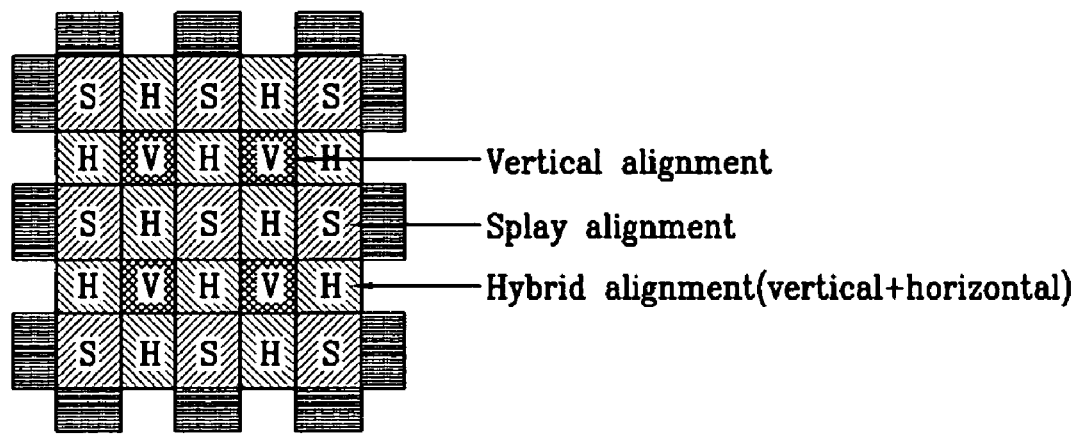
FIG. 14 is a simplified plan view of an alignment area of the liquid crystal display device according to the exemplary embodiment of the present invention.
Figure 15:
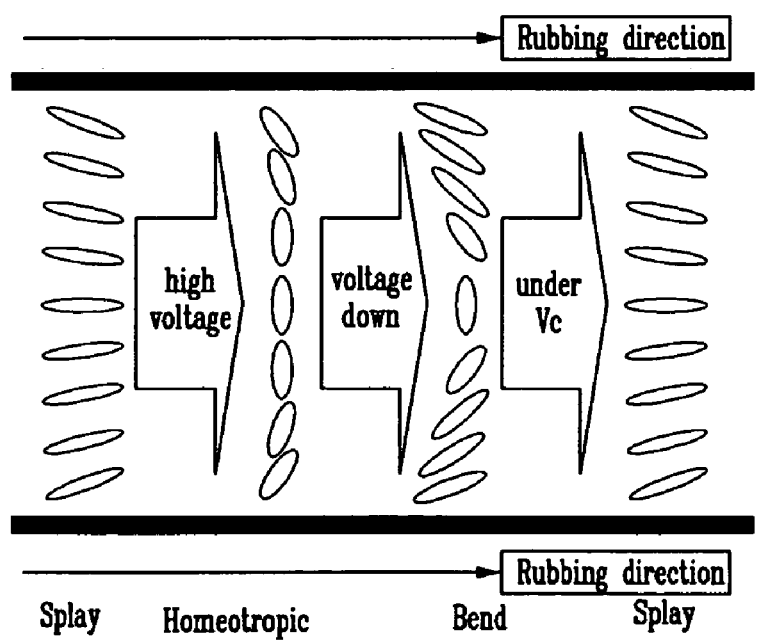
FIG. 15 is a simplified cross-sectional view illustrating alignment states of liquid crystal molecules corresponding to driving states in a conventional OCB mode liquid crystal display device.

As described above, by coupling the common electrode substrate 200 and the thin film transistor substrate 100 and filling a liquid crystal therebetween, as shown in FIG. 14, the liquid crystal layer is divided into the splay areas S, the homeotropic areas V, and the hybrid areas H. Further, the hybrid areas H are disposed around the splay areas S and the homeotropic areas V.

Subsequently, the compensation films 13 and 23 and the polarizing films 12 and 22 are disposed outside the common electrode substrate 200 and the thin film transistor substrate 100, respectively, and the backlight unit is provided below the lower polarizing film 12.

In this way, by dividing the liquid crystal layer into the splay areas S, the homeotropic areas V, and the hybrid areas H and allowing the hybrid areas H to surround the splay areas S, the hybrid areas H serve as alignment transition seeds when the alignment transition voltage is applied to the liquid crystal layer, so that the liquid crystal molecules are easily changed to the band alignment. Therefore, it is possible to reduce the alignment transition voltage and to enhance the alignment transition speed.

In addition, since the homeotropic areas V or the hybrid areas H serving as the alignment transition seeds are covered with the black matrix, only the splay areas S contribute to display, and since the liquid crystal molecules of the splay areas S have a substantially uniform electro-optical characteristic, improved image quality is realized.

Since the hybrid areas H serving as the alignment transition seeds are formed even when the thin film transistor substrate and the common electrode substrate are slightly inaccurately arranged with respect to each other, the arrangement margin between the substrates is increased.

While the present invention has been particularly shown and described with reference to certain exemplary embodiments thereof, it will be understood by those skilled in the art that various changes in form and details may be made therein without departing from the spirit or scope of the present invention as defined by the appended claims. Therefore, the scope of the invention should be defined by the appended claims, and equivalents thereof.

What is claimed is:

1. A liquid crystal display device comprising:
   a first substrate having an inner surface and an outer surface;
   a first electrode on the inner surface of the first substrate;
   a first alignment film of a vertical orientation on the first electrode;
   a second alignment film of a horizontal orientation in a shape of plural belts substantially in parallel with each other on the first alignment film;
   a second substrate having an inner surface and an outer surface, the inner surface of the second substrate being opposite to the inner surface of the first substrate;
   a second electrode on the inner surface of the second substrate;
   a third alignment film of the vertical orientation on the second electrode;
   a fourth alignment film of the horizontal orientation in a shape of plural belts substantially in parallel with each other on the third alignment film; and
   a liquid crystal layer between the first substrate and the second substrate,
   wherein the plural belts of the second alignment film and the plural belts of the fourth alignment film cross each other, and
   wherein liquid crystal molecules of the liquid crystal layer are splay-aligned in an area where the second alignment film and the fourth alignment film overlap with each other and have a same horizontal orientation with respect to the first and the second substrates when the liquid crystal layer is traversed from the first substrate to the second substrate.

2. The liquid crystal display device of claim 1, further comprising a plurality of gate lines on the inner surface of the first substrate, a plurality of data lines crossing the plurality of gate lines and a plurality of thin film transistors connected to the plurality of gate lines and the plurality of data lines,
   wherein the first electrode comprises a plurality of pixel electrodes connected to the plurality of thin film transistors, respectively, and the second electrode comprises a single common electrode opposite to the plurality of pixel electrodes.

3. The liquid crystal display device of claim 2, wherein each of the plural belts of the second alignment film is between corresponding two adjacent ones of the gate lines to extend substantially in parallel to the gate lines, and each of the plural belts of the fourth alignment film is between corresponding two adjacent ones of the data lines to extend substantially in parallel to the data lines.

4. The liquid crystal display device of claim 1, wherein the alignment films of the vertical orientation are vertical alignment films and the alignment films of the horizontal orientation are horizontal alignment films.

5. The liquid crystal display device of claim 4, wherein the horizontal alignment films have a pre-tilt angle between 4° and 5°, and the vertical alignment films have a pre-tilt angle between 89° and 90°.

6. The liquid crystal display device of claim 2, wherein liquid crystal molecules of the liquid crystal layer are aligned to be vertical to the first and the second substrates in an area where the first alignment film and the third alignment film overlap with each other without the second alignment film and the fourth alignment film disposed therebetween, are splay-aligned in an area where the second alignment film and the fourth alignment film overlap with each other, and are aligned in a hybrid state in an area where the first alignment film and the fourth alignment film overlap with each other without the second alignment film disposed therebetween and an area where the second alignment film and the third alignment film overlap with each other without the fourth alignment film disposed therebetween.

7. The liquid crystal display device of claim 6, wherein the area where the liquid crystal molecules are splay-aligned is positioned above the pixel electrodes, the area where the liquid crystal molecules are aligned to be vertical is positioned above portions where the gate lines and the data lines cross each other, and the area where the liquid crystal molecules are aligned to be hybrid is positioned above the gate lines and the data lines.

8. The liquid crystal display device of claim 7, further comprising a black matrix on the inner surface of the second substrate and overlapped with the area where the liquid crystal molecules are aligned to be vertical and the area where the liquid crystal molecules are aligned to be hybrid.

9. The liquid crystal display device of claim 1, wherein the plural belts of the second alignment film and the plural belts of the fourth alignment film cross each other to be substantially perpendicular to each other.

10. The liquid crystal display device of claim 1, further comprising a compensation film on at least one of the outer surfaces of the first and the second substrates.

11. The liquid crystal display device of claim 1, wherein the liquid crystal display device is a field-sequential liquid crystal display device.

12. A liquid crystal display device comprising:
a first substrate having an inner surface and an outer surface;
a first electrode on the inner surface of the first substrate;
a second substrate having an inner surface and an outer surface, the inner surface of the second substrate being opposite to the inner surface of the first substrate;
a second electrode on the inner surface of the second substrate;
a liquid crystal layer between the first substrate and the second substrate;
a first horizontal alignment film in a shape of plural belts substantially in parallel with each other on the first electrode; and
a second horizontal alignment film in a shape of plural belts substantially in parallel with each other on the second electrode,
wherein the plural belts of the first horizontal alignment film and the plural belts of the second horizontal alignment film cross each other to be substantially perpendicular to each other,
wherein the liquid crystal layer comprises a splay area where the first horizontal alignment film and the second horizontal alignment film overlap with each other and where liquid crystal molecules are splay-aligned and have a same horizontal orientation with respect to the first and the second substrates when the liquid crystal layer is traversed from the first substrate to the second substrate, a homeotropic area where the liquid crystal molecules are aligned to be vertical to the first and the second substrates and have a same orientation, and a hybrid area where the liquid crystal molecules are changed from vertical alignment to horizontal alignment or are changed from horizontal alignment to vertical alignment when the liquid crystal layer is traversed from the first substrate to the second substrate.

13. The liquid crystal display device of claim 12, wherein the hybrid area is around the splay area.

14. The liquid crystal display device of claim 13, wherein the hybrid area is around the homeotropic area.

15. The liquid crystal display device of claim 12, further comprising:
a first vertical alignment film on the first electrode, wherein the first horizontal alignment film is on the first vertical alignment film; and
a second vertical alignment film on the second electrode, wherein the second horizontal alignment film is on the second vertical alignment film.

16. The liquid crystal display device of claim 15, further comprising a plurality of gate lines on the inner surface of the first substrate, a plurality of data lines crossing the plurality of gate lines, and a plurality of thin film transistors connected to the plurality of gate lines and the plurality of data lines,
wherein the first electrode comprises a plurality of pixel electrodes connected to the plurality of thin film transistors, respectively, and the second electrode comprises a single common electrode opposite to the plurality of pixel electrodes.

17. The liquid crystal display device of claim 16, wherein each of the plural belts of the first horizontal alignment film is between corresponding two adjacent ones of the gate lines to extend substantially in parallel to the gate lines and each of the plural belts of the second horizontal alignment film is between corresponding two adjacent ones of the data lines to extend substantially in parallel to the data lines.

18. The liquid crystal display device of claim 16, wherein the horizontal alignment films have a pre-tilt angle between 4° and 5°, and the vertical alignment films have a pre-tilt angle between 89° and 90°.

19. The liquid crystal display device of claim 16, wherein the homeotropic area of the liquid crystal layer comprises an area where the first vertical alignment film and the second vertical alignment film overlap with each other without the first horizontal alignment film and the second horizontal alignment film therebetween, the splay area comprises an area where the first horizontal alignment film and the second horizontal alignment film overlap with each other, and the hybrid area comprises an area where the first vertical alignment film and the second horizontal alignment film overlap with each other without the first horizontal alignment film therebetween and an area where the first horizontal alignment film and the second vertical alignment film overlap with each other without the second horizontal alignment film therebetween.

20. The liquid crystal display device of claim 16, wherein the splay area is positioned above the pixel electrodes, the homeotropic area is positioned above portions where the gate lines and the data lines cross each other, and the hybrid area is positioned above the gate lines and the data lines.

21. The liquid crystal display device of claim 16, further comprising a black matrix on the inner surface of the second substrate, and overlapped with the homeotropic area and the hybrid area.

22. The liquid crystal display device of claim 12, wherein the liquid crystal display device is a field-sequential liquid crystal display device.

23. A liquid crystal display device comprising:
first and second substrates having a liquid crystal layer therebetween, the liquid crystal layer comprising a plurality of liquid crystal molecules;
first horizontal and vertical alignment films on the first substrate on a side facing the liquid crystal layer, wherein the first horizontal alignment film is exposed to some of the liquid crystal molecules adjacent to the first substrate while the first vertical alignment film is exposed to others of the liquid crystal molecules adjacent to the first substrate; and
second horizontal and vertical alignment films on the second substrate on a side facing the liquid crystal layer, wherein the second horizontal alignment film is exposed to some of the liquid crystal molecules adjacent to the second substrate while the second vertical alignment film is exposed to others of the liquid crystal molecules adjacent to the second substrate,
wherein the first horizontal alignment film has a shape of substantially parallel, plural belts on the first vertical alignment film, and the second horizontal alignment film has a shape of substantially parallel, plural belts on the second vertical alignment film,
wherein the plural belts of the first horizontal alignment film and the plural belts of the second horizontal alignment film are substantially perpendicular to each other, wherein the first and second horizontal alignment films have a same alignment orientation, and wherein in an area where the first and second horizontal alignment films overlap with each other, the liquid crystal molecules are splay-aligned and have a same horizontal orientation with respect to the first and the second substrates when the liquid crystal layer is traversed from the first substrate to the second substrate.

24. The liquid crystal display device of claim 23, wherein the liquid crystal molecules are aligned to be vertical to the first and second substrates in an area where the vertical alignment films are exposed to the liquid crystal molecules, wherein the liquid crystal molecules are splay-aligned in an area where the horizontal alignment films are exposed to the liquid crystal molecules, and wherein the liquid crystal molecules are aligned in a hybrid state in an area where the first horizontal alignment film and the second vertical alignment film are exposed to the liquid crystal molecules and in an area where the second horizontal alignment film and the first vertical alignment film are exposed to the liquid crystal molecules.

* * * * *

UNITED STATES PATENT AND TRADEMARK OFFICE
CERTIFICATE OF CORRECTION

PATENT NO. : 7,872,717 B2  
APPLICATION NO. : 11/245720  
DATED : January 18, 2011  
INVENTOR(S) : Tae-Hyeog Jung et al.

Page 1 of 1

It is certified that error appears in the above-identified patent and that said Letters Patent is hereby corrected as shown below:

On the Title Page, ITEM

| | |
|---|---|
| (56) References Cited OTHER PUBLICATIONS, page 2, line 8 | Delete "Aug. 4, 1997" Insert -- April 8, 1997 -- |
| (56) References Cited OTHER PUBLICATIONS, page 2, line 10 | Delete "Dec. 1, 1999" Insert -- Jan. 12, 1999 -- |

Signed and Sealed this
Seventh Day of February, 2012

David J. Kappos
*Director of the United States Patent and Trademark Office*